Aug. 23, 1960 S. G. BRADY 2,949,706
APPARATUS FOR FORMING BROACH TYPE TOOLS
Filed Jan. 22, 1957 4 Sheets-Sheet 1
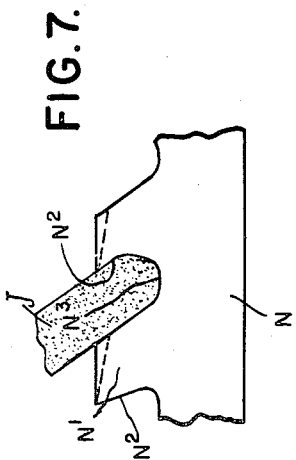
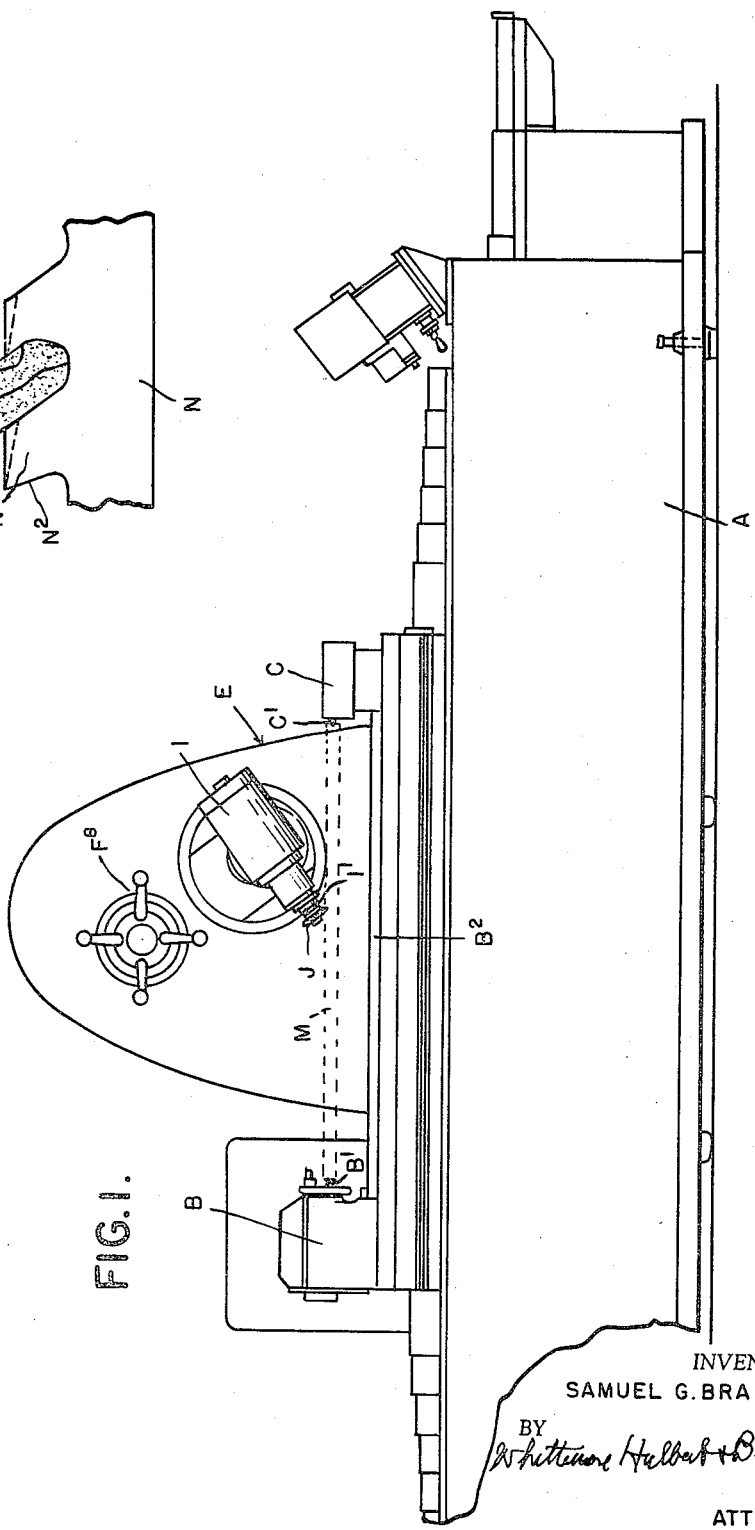
INVENTOR.
SAMUEL G. BRADY
BY
*Whittemore Hulbert + Belknap*
ATTORNEYS Aug. 23, 1960   S. G. BRADY   2,949,706
APPARATUS FOR FORMING BROACH TYPE TOOLS
Filed Jan. 22, 1957   4 Sheets-Sheet 2
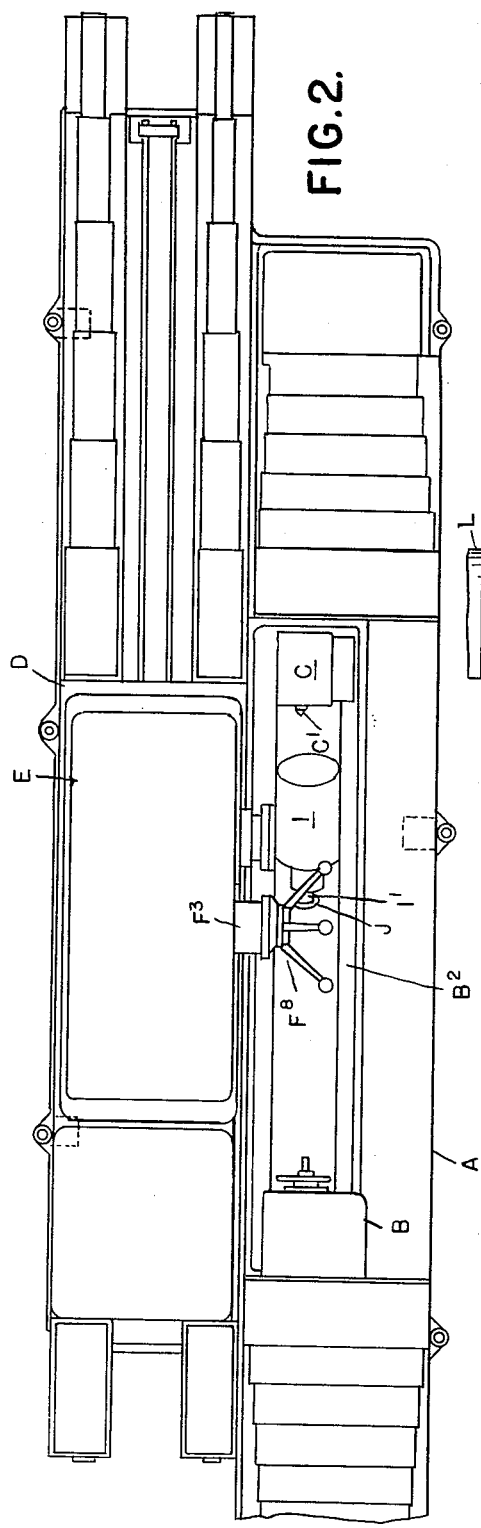
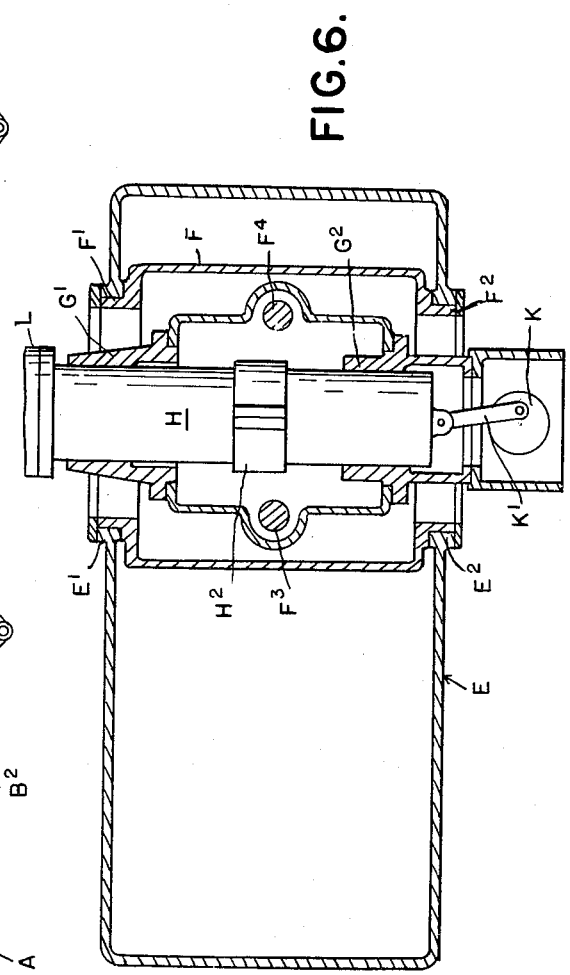
INVENTOR.
SAMUEL G. BRADY
BY
Whittemore Hulbert + Belknap
ATTORNEYS Aug. 23, 1960                    S. G. BRADY                    2,949,706
                    APPARATUS FOR FORMING BROACH TYPE TOOLS
Filed Jan. 22, 1957                                          4 Sheets-Sheet 3
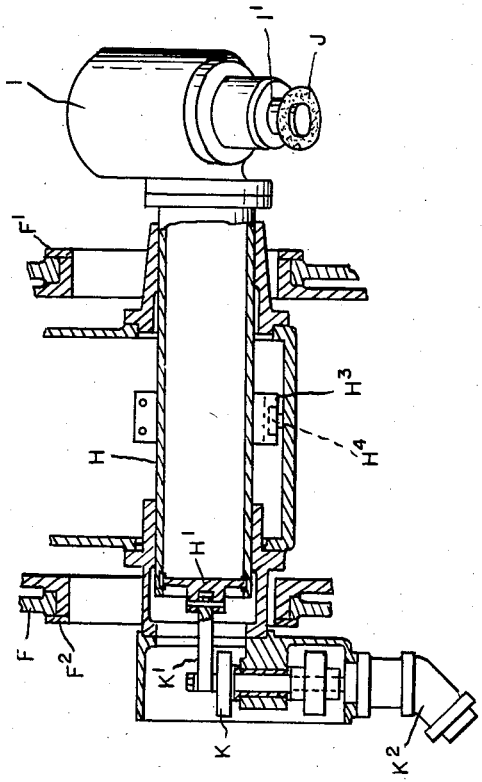
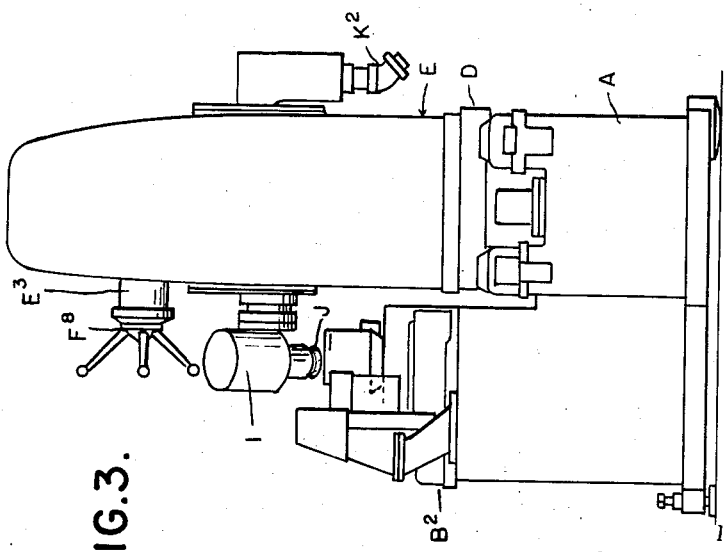
INVENTOR.
SAMUEL G. BRADY
BY
*Whittemore Halbert & Belknap*
ATTORNEYS

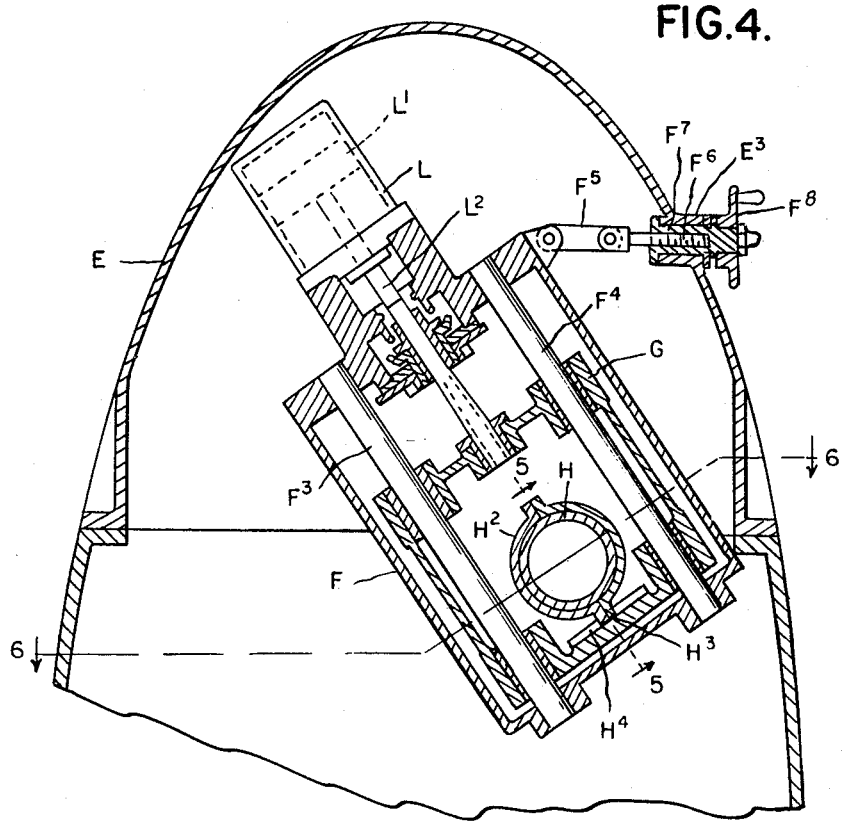

Patented Aug. 23, 1960

2,949,706

APPARATUS FOR FORMING BROACH TYPE TOOLS

Samuel G. Brady, Birmingham, Mich., assignor, by mesne assignments, to Ex-Cell-O Corporation, Detroit, Mich., a corporation of Michigan Filed Jan. 22, 1957, Ser. No. 635,437

11 Claims. (Cl. 51—34)

The invention relates to the manufacture of multiple edge cutting tools and more particularly those of the broach type. It is the object of the invention to simplify the operations for forming the tool and to adapt them to being performed by automatic machines. To this end the invention consists in the apparatus as hereinafter set forth.

Broach tools in common with other cutting tools have the following characteristics:

(a) The front face of the tooth or portion having the cutting edge is at a predetermined angle to the direction of cutting movement of the tool with respect to the work;

(b) The portion or so-called back-off in rear of the cutting edge is also at a predetermined angle to said direction of movement.

In addition broach tools are formed with a recess or gullet adjacent to said front face and between the same and the next tooth or cutting edge for receiving the cuttings or shavings removed from the work and carrying them to a point of discharge. Broaches are sometimes circular in cross section or they may have teeth with rectilinear or other contoured cutting edges. My improved apparatus includes the continuous feeding of a form grinder wheel into a registering portion of a broach blank and the simultaneous reciprocation of said grinder wheel transversely of the direction of feed to fashion and reduce to size the said registering portion and repeating said operations in successive registering position. The apparatus includes mechanism for performing said operations and indexing mechanism for effecting the successive registrations.

In the accompanying drawings:

Fig. 1 is a front elevation.

Fig. 2 is a plan view.

Fig. 3 is an end elevation of the machine for automatically fashioning the broach tool.

Fig. 4 is a sectional front elevation showing the mechanism for automatically feeding the grinder wheel into the work.

Fig. 5 is a cross section on line 5—5, Fig. 4, illustrating the reciprocating mechanism for moving the grinder wheel transversely of the blank.

Fig. 6 is a cross section on line 6—6, Fig. 4.

Fig. 7 is a diagram showing a portion of the tool blank with the grinder wheel in engagement therewith for forming the front face of a tooth and the gullet between the same and an adjacent tooth.

As shown in Figs. 1 to 3, A is the frame or bed of the machine having mounted on the front portion thereof a work table $B^2$ for holding the tool blank, having a headstock B, a tailstock C, and centers B' and C'. In rear of this work table $B^2$ is a reciprocating table or carriage D having mounted thereon an upwardly extending housing E. Within this housing is an angularly adjustable frame F having hollow trunnions F' and $F^2$ engaging circular bearings E' and $E^2$, respectively in the front and rear walls of the housing E. The frame F is also provided with spaced parallel guideways $F^3$ and $F^4$ for a carriage G adjustable thereon. This carriage has aligned bearings G' and $G^2$ for a transversely reciprocating tubular sub-carriage H extending oppositely outward through the hollow trunnions F' and $F^2$. Mounted at the front end of the sub-carriage H is a motorized grinding unit including an electric motor I for rotating an arbor I' carrying a formed grinder wheel J, the axis of said arbor and grinder wheel extending transverse to the axis of the said sub-carriage H. The sub-carriage is reciprocated by suitable means, which as shown comprises a rotary crank K mounted on an extension of the bearing $G^2$ and coupled by a connecting rod K' with a head H' at the end of said sub-carriage. The crank K is rotated at the desired speed by a hydraulic motor $K^2$. The frame F is angularly adjustable about the axis of the hollow trunnions and for this purpose it is connected by a pivotal link $F^5$ with a threaded rod $F^6$ engaging a rotatable nut $F^7$ in a bearing $E^3$ in the wall of the housing E. A handle $F^8$ outside said housing rotates the nut $F^7$ to move the rod $F^6$ axially and through the link $F^5$ angularly adjust the frame F. For moving the carriage G on the guideways $F^3$ and $F^4$ there is mounted at the upper end of the frame F a cylinder L containing a piston L' connected by a rod $L^2$ to the upper end of the carriage G. Hydraulic connections (not shown) to the opposite ends of the cylinder L serve for introducing metered fluid into the upper end of the cylinder which moves the piston downward against the pressure of fluid ejected from the lower end of the cylinder at a predetermined rate. The hollow trunnions F' and $F^2$ are sufficient in diameter for the passage outward therethrough of portions of the sub-carriage H without interference in all positions of adjustment of the piston L'.

With the construction as thus far described the broach blank M mounted on the centers B', C' and held against rotation will be in operative relation to the grinder wheel J. The table or carriage D is provided with suitable indexing mechanism (not shown) through which the grinder wheel may be successively registered with indexed points in the length of the blank. The grinder wheel is fashioned by trimming mechanism (not shown) to correspond to the cross section of the gullets to be ground in the blank in successive indexed positions thereof. It also fashions the front face of each tooth or portion having the cutting edge and the angle of this face with respect to the longitudinal axis of the blank may be determined by adjustment of the handle $F^8$ and angular adjustment of the frame F.

As shown in Fig. 7 the blank N has the teeth N' thereof undercut with respect to its longitudinal axis with the front face $N^2$ at the desired angle. During the automatic operation of the machine the grinder wheel will be continuously fed into the blank by the metered hydraulic fluid in the cylinder L which will simultaneously form the front face of the tooth and the gullet $N^3$ between the same and another tooth. During this continuous feed the grinder wheel will be reciprocated transversely of the blank by the sub-carriage H and its actuating crank K. The sub-carriage is held from rotation in the bearings G', $G^2$ by a collar $H^2$ clamped thereabout having a spline $H^3$ engaging a splineway $H^4$ in the carriage G. Thus, all of the teeth of the broach may be successively ground by the automatic operation of the machine. This does not, however, form the back-off for each tooth, which operation may be automatically performed in a second machine. Such machine may be the same in general construction as the machine above described. However, the specific construction of this machine is no part of the subject matter of this application.

What I claim as my invention is:

1. In a grinding machine, a bed, a holder for work thereon, a housing extending upward from said bed, a frame within said housing having a hollow trunnion pivotally engaging a circular opening in a wall of said housing, a rotatable grinder wheel unit including a grinder wheel mounted on said frame to be movable on said frame in transverse directions, said mounting extending through said hollow trunnion with the grinder wheel outside of said housing in operative relation to work in said holder, means for moving said unit in one of said directions to feed the grinder wheel into work in said holder, means for simultaneously reciprocating said unit transversely of the direction of feed, and means for angular adjustment of said frame about the axis of said trunnion to determine the angle of each of said movements in relation to work in said holder.

2. The construction as in claim 1 in which the mounting of said unit on said frame includes a guideway on the frame, a carriage on said guideway having a transversely extending guideway thereon, and a sub-carriage on the latter guideway on which said unit is directly mounted.

3. The construction as in claim 2 in which the guideway for movement of the sub-carriage is generally in the direction of the axis of said trunnion, said motorized grinder wheel unit being wholly outside said housing with its axis of rotation transverse to the axis of said trunnion.

4. The construction as in claim 3 in which said frame has a second hollow trunnion engaging an opening in the opposite wall of said housing and said reciprocating means for said sub-carriage operating thereon through the latter opening.

5. The construction as in claim 4 in which said reciprocating means includes a rotary crank, a connecting rod between said crank and sub-carriage and hydraulic motors for respectively operating said carriage and said reciprocating means.

6. In a grinding machine, a work holder, a sub-frame adjacent said work holder, a housing extending upwardly from said sub-frame, a rotatable frame mounted in said housing, a grinding wheel operably associated with said housing for movement in transverse directions, means for moving said grinding wheel in one of said directions to feed the grinding wheel into a work piece carried by said work holder, means for reciprocating said grinding wheel in the other of said directions transversely of the direction of feed and during the feeding movement, and means to adjust the angle of feed between a work piece held by said work holder and said grinding wheel including said rotatable frame.

7. In a grinding machine, a work holder, a sub-frame adjacent said work holder, a housing extending upwardly from said sub-frame, a rotatable frame mounted in said housing, a grinding wheel operably associated with said housing for movement in transverse directions, means for moving said grinding wheel in one of said directions to feed the grinding wheel into a work piece carried by said work holder, including a hydraulically operated carriage mounted in said frame, means for reciprocating said grinding wheel in the other of said directions transversely of the direction of feed and during the feeding movement.

8. In a grinding machine, a work holder, a sub-frame adjacent said work holder, a housing extending upwardly from said sub-frame, a rotatable frame mounted in said housing, a grinding wheel operably associated with said housing for movement in transverse directions, means for moving said grinding wheel in one of said directions to feed the grinding wheel into a work piece carried by said work holder, including a hydraulically operated carriage mounted in said frame, means for reciprocating said grinding wheel in the other of said directions transversely of the direction of feed and during the feeding movement, including a sub-carriage slidably mounted for reciprocating movement on said carriage.

9. In a grinding machine, a work holder, a sub-frame adjacent said work holder, a housing extending upwardly from said sub-frame, a rotatable frame mounted in said housing, a grinding wheel operably associated with said housing for movement in transverse directions, means for moving said grinding wheel in one of said directions to feed the grinding wheel into a work piece carried by said work holder, including a hydraulically operated carriage mounted in said frame, means for reciprocating said grinding wheel in the other of said directions transversely of the direction of feed and during the feeding movement, including a sub-carriage slidably mounted for reciprocating movement on said carriage, and means to adjust the angle of feed between a work piece held by said work holder and said grinder wheel including said rotatable frame.

10. In a grinding machine, a work holder, a housing adjacent said work holder, a rotatable frame mounted in said housing, a grinding wheel operably associated with said housing for movement in transverse directions, means for moving said grinding wheel in one of said directions to feed the grinding wheel into a work piece carried by said work holder, means for reciprocating said grinding wheel in the other of said directions transversely of the direction of feed and during the feeding movement, and means to adjust the angle of feed between a work piece held by said work holder and said grinding wheel including said rotatable frame.

11. In a grinding machine, a work holder, a support adjacent said work holder, a grinding wheel carried by said support for movement in transverse directions, means for moving said grinding wheel in one of said directions to feed the grinding wheel into a work piece carried by said work holder, means for reciprocating said grinding wheel in the other of said directions transversely of the direction of feed and during the feeding movement, and means to adjust the angle of feed between a work piece held by said work holder and said grinding wheel.

References Cited in the file of this patent

UNITED STATES PATENTS

| | | |
|---|---|---|
| 1,131,999 | Denley et al. | Mar. 16, 1915 |
| 1,617,798 | Edgar | Feb. 15, 1927 |
| 1,725,246 | Bath | Aug. 20, 1929 |
| 1,966,869 | Owen | July 17, 1934 |
| 2,136,266 | Reinecker | Nov. 8, 1938 |
| 2,438,543 | Custin et al. | Mar. 30, 1948 |
| 2,518,018 | Jung | Aug. 8, 1950 |